(12) United States Patent
Madineni et al.

(10) Patent No.: US 11,867,520 B2
(45) Date of Patent: Jan. 9, 2024

(54) ENERGY ASSESSMENT FOR CHARGING A TOWED VEHICLE

(71) Applicant: Rivian IP Holdings, LLC, Plymouth, MI (US)

(72) Inventors: Rahul Madineni, Farmington Hills, MI (US); Gary Gloceri, Livonia, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 314 days.

(21) Appl. No.: 17/007,094

(22) Filed: Aug. 31, 2020

(65) Prior Publication Data

US 2022/0065643 A1   Mar. 3, 2022

(51) Int. Cl.
| | |
|---|---|
| *G01C 21/34* | (2006.01) |
| *B60L 58/31* | (2019.01) |
| *B60L 58/12* | (2019.01) |
| *G01C 21/36* | (2006.01) |
| *B60L 53/24* | (2019.01) |

(52) U.S. Cl.
CPC .......... *G01C 21/3469* (2013.01); *B60L 53/24* (2019.02); *B60L 58/12* (2019.02); *B60L 58/31* (2019.02); *G01C 21/3697* (2013.01); *B60L 2260/52* (2013.01)

(58) Field of Classification Search
CPC ............ G01C 21/3469; G01C 21/3697; B60L 2260/52; B60L 2240/622
See application file for complete search history.

(56) References Cited

U.S. PATENT DOCUMENTS

| | | | |
|---|---|---|---|
| 2011/0082816 A1* | 4/2011 | Moffett | G06Q 30/0283 705/400 |
| 2021/0197673 A1* | 7/2021 | Espig | B60L 53/53 |
| 2022/0126704 A1* | 4/2022 | Flaum | B60L 15/2009 |

FOREIGN PATENT DOCUMENTS

JP        2001236538 A  *  8/2001

* cited by examiner

*Primary Examiner* — Jeffrey C Boomer
(74) *Attorney, Agent, or Firm* — Clements Bernard Walker; Christopher L. Bernard

(57) ABSTRACT

Disclosed embodiments include systems, vehicles, and methods for determining a quantity of energy expendable in charging a towed vehicle while it is towed. In an illustrative embodiment, a computing system transportable aboard at least one of a towing vehicle and a towed vehicle includes computer-readable media storing computer-executable instructions configured to identify a quantity of charging energy to be supplied to at least one power cell of the towed vehicle by at least one rotating electromagnetic device of the towed vehicle generating and supplying electrical power to charge the at least one power cell of the towed vehicle while the towed vehicle is towed by the towing vehicle. The computer-executable instructions are also configured to determine a quantity of towing energy expendable by the towing vehicle in towing the towed vehicle to provide the quantity of charging energy to the at least one power cell of the towed vehicle.

20 Claims, 8 Drawing Sheets

ENERGY ASSESSMENT FOR CHARGING A TOWED VEHICLE

INTRODUCTION

The present disclosure relates to determining a cost of energy to charge a towed vehicle while it is towed.

The statements in this section merely provide background information related to the present disclosure and may not constitute prior art.

For a tow truck or other towing vehicle to tow another vehicle through a distance requires an amount of energy sufficient for the tow truck to drive that distance plus an additional amount of energy to enable the tow truck to transport the load represented by the towed vehicle. Most passenger vehicles, light trucks, and small sport utility vehicles ("SUVs") weigh between 1.5 tons and 2 tons. Although even a light duty tow truck may easily weigh two to three times that much, the weight of the towed vehicle contributes significantly to the combined weight of their combination. Thus, in determining what to charge for towing a vehicle, the operator must consider the quantity of energy—typically in the form of a quantity of gasoline or diesel fuel—required to transport the towed vehicle.

Electrically-powered or hybrid electric/fuel vehicles include a drive train that is powered or partially powered by electrical power provided by one or more power cells aboard the vehicle. An electric or hybrid vehicle may include an electric motor that, responsive to electrical power being provided to the electric motor from the power cells, motor produces motive force to turn the wheels of the vehicle.

On the other hand, when power is not applied to the electric motor, when spun the motor generates electrical power. For example, when the vehicle is coasting downhill, if the motor is connected to the wheels, the motor may generate electrical power that may be used to charge the one or more power cells.

The motor aboard an electric or hybrid vehicle may function as a generator to generate electrical power when the vehicle is being towed. When the vehicle is towed, wheels of the vehicle are rotated which, in turn, may be used to drive the motor to generate electrical power to charge the power cells of the towed vehicle. The quantity of energy stored during towing saves the towed vehicle at least a portion of the cost and the time of charging the towed vehicle upon reaching the destination. However, electrical current (that is used to charge the power cells) flowing in stator coils of the motor of the towed vehicle generates a counter-torque (that is, a braking force), thereby resulting in an additional load being placed on the towing vehicle. Thus, when the motor is rotated to generate electrical power that is supplied to the power cell, the towing vehicle uses more power and/or consumes additional fuel.

BRIEF SUMMARY

Disclosed embodiments include systems, vehicles, and methods for determining a cost for energy to charge a towed vehicle while it is towed.

In an illustrative embodiment, a system includes a computing system transportable aboard at least one of a towing vehicle and a towed vehicle. The computing system includes computer-readable media storing computer-executable instructions configured to identify a quantity of charging energy to be supplied to at least one power cell of the towed vehicle by at least one rotating electromagnetic device of the towed vehicle generating and supplying electrical power to charge the at least one power cell of the towed vehicle while the towed vehicle is towed by the towing vehicle. The computer-executable instructions are also configured to determine a quantity of towing energy expendable by the towing vehicle in towing the towed vehicle to provide the quantity of charging energy to the at least one power cell of the towed vehicle.

In another illustrative embodiment, a vehicle includes at least one power cell configured to provide electrical power. A drive system is configured to control one or more wheels of the vehicle to motivate, accelerate, decelerate, stop, and steer the vehicle. The drive system includes one of an electrical power system and a hybrid power system. The drive system also includes a rotating electromagnetic device configured to engage one or more of the wheels, generate electrical power in response to rotation of the one or more wheels, and supply the generated electrical power to charge the at least one power cell. A computing system includes computer-readable media storing computer-executable instructions configured to identify a quantity of charging energy to be supplied to at least one power cell of the vehicle by at least one rotating electromagnetic device of the vehicle generating and supplying electrical power to charge the at least one power cell of the vehicle while the vehicle is towed by the towing vehicle. The computer-executable instructions are also configured to determine a quantity of towing energy expendable by the towing vehicle in towing the vehicle to provide the quantity of charging energy to the at least one power cell of the vehicle.

In another illustrative embodiment, a method includes providing a quantity of charging energy to at least one power cell of a towed vehicle being towed by a towing vehicle resulting from at least one rotating electromagnetic device of the towed vehicle generating and supplying electrical power to the at least one power cell. The method also includes determining a quantity of towing energy expendable by the towing vehicle as result of the at least one rotating electromagnetic device of the towed vehicle generating and supplying electrical power to the at least one power cell.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of the three-digit reference numbers corresponds to the figure number in which the element first appears.

Figure 1:
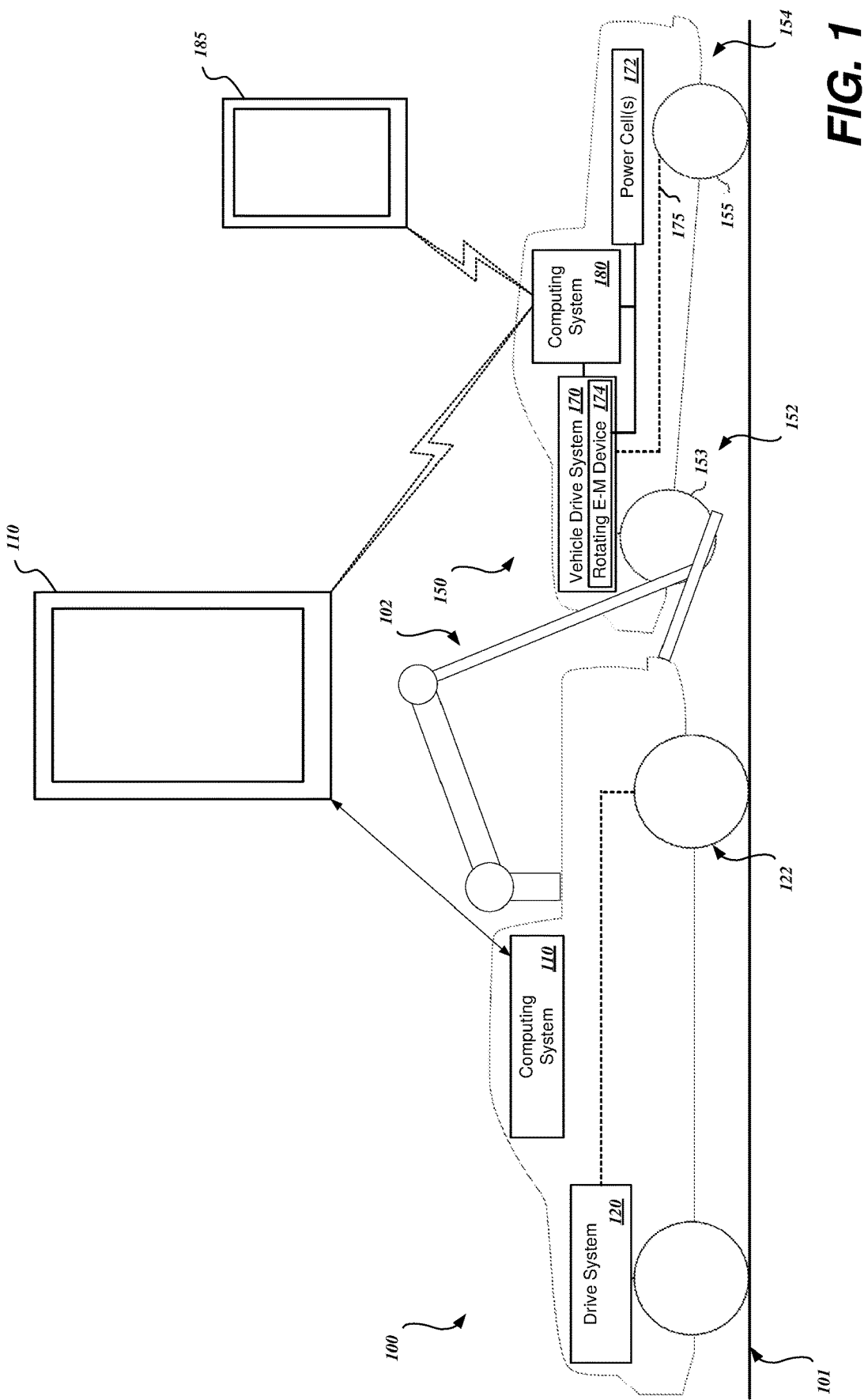
FIG. 1 is a block diagram in partial schematic form of an illustrative system for determining energy used in towing a vehicle that charges power cells of the towed vehicle during towing.

According to various embodiments, systems, vehicles, and methods can help to assess a cost of towing a vehicle for which a rotating electromagnetic device aboard the towed vehicle is operated for at least a part of the distance traveled. Referring to FIG. 1, in an illustrative embodiment, a towing vehicle 100 is coupled with a vehicle being towed or to be towed, which will be termed a "towed vehicle" 150. The towing vehicle 100 includes a towing rig 102 that is used to couple the towed vehicle 150 with the towing vehicle 100. In various embodiments, the towing rig 102 may be used to partially lift the towed vehicle 150, such as shown in FIG. 1, where a front end 152 and front wheels 153 of the towed vehicle 150 is lifted from a road surface 101. Alternatively, the towing rig 102 may be coupled with the front end 152 of the towed vehicle 150 without lifting the front end 152 and the front wheels 153 from the road surface 101 (not shown in FIG. 1). Although not shown in FIG. 1, it will be appreciated that a rear end 154 and rear wheels 155 of the towed vehicle 150 may be lifted from the road surface 101 by the towing rig 102, or the towing rig 102 may be used to couple the towing vehicle 100 to the rear end 154 of the towed vehicle 150 without lifting the rear wheels off of the road surface 100. As further described below, in various embodiments, at least either the front wheels 153 or the rear wheels 155 of the towed vehicle 150 will be left in contact with the road surface 101 during towing.

The towing vehicle 100 includes a computing system 110 that may be integral with or transportable aboard the towing vehicle 100. When the computing system 110 is integral with the towing vehicle 100, the computing system 110 may have a display and keyboard or a touchscreen display to enable user operation of the computing system 110. When the computing system 110 is transportable aboard the towing vehicle 100, the computing system 110 may include a tablet computer, a smartphone, a smartwatch, or another portable computing system that includes a display and keyboard or a touchscreen display to permit user operation of the computing system 110. The computing system 110 may include communications facilities to enable communications with a computing system 160 aboard the towed vehicle 150 or with other remote computing systems as further described below.

The towing vehicle 100 includes a drive system 120 that is used to motivate, accelerate, decelerate, stop, steer, and otherwise control movement of the towing vehicle 100. The drive system 120 typically is selectively couplable by a selective linkage 124 (the dashed line representing the selective nature of the selective linkage 124). The selective linkage 124, for example, may include a transmission system that selectively couples the drive system 120 with the rear wheels 122.

The drive system 120 driving the rear wheels 122 via the selective linkage 124 has the capacity to motivate, accelerate, decelerate, stop, steer, and otherwise control movement of the towing vehicle 100 with the towed vehicle 150 coupled therewith. It will be appreciated that the drive system 120 has greater capacity to motivate, accelerate, decelerate, and stop the combination of the towing vehicle 100 and the towed vehicle 150 than would be required to motivate, accelerate, decelerate, and stop either the towing vehicle or the towed vehicle 150 separately. The drive system 120 may be gasoline or diesel fuel-powered drive system, an electric drive system, or a hybrid fuel and electric drive system.

The towed vehicle 150 also includes a vehicle drive system 170. In various embodiments, the vehicle drive system 170 includes an electric or hybrid system for which at least a portion of the power for the vehicle drive system 170 is provided by one or more power cells 172.

The vehicle drive system 170 includes one or more rotating electromagnetic devices 174. The rotatable electromagnetic device 174 may an electric motor that operates as a motor (when powered) and functions as a generator (when un-powered and spun). The towed vehicle 150 may include one rotating electromagnetic device 174 to provide power to the wheels 153 and 155 or the towed vehicle 150 may include multiple rotating electromagnetic devices 174, such as independent rotating electromagnetic devices for each axle or each of the wheels 153 and 155. For purposes of the following description, a case of one rotating electromagnetic device 174 is described, but it will be appreciated that this is a matter of convenience and not presented by way of limitation.

When operating as a motor, electrical power provided by the power cells 172 provides power to the rotating electromagnetic device 174 to provide motive force via one or more selective linkages 175 to the front wheels 153 and/or the rear wheels 155 of the towed vehicle 150. On the other hand, the rotating electromagnetic device 174 may function as a generator when the rotating electromagnetic device 174 is not powered and the towed vehicle 150 is moving without being driven by its own motive force (thereby rotating the rotating electromagnetic device 174). When functioning as a generator, the rotating electromagnetic device 174 may be selectively coupled by one or more selective linkages 175 with the front wheels 153 and/or the rear wheels of the towed vehicle 150. Although FIG. 1 shows the front wheels 153 of the towed vehicle 150 being lifted from the road surface 101, it will be appreciated that the towed vehicle 150 may be towed with the front wheels 153 on the road surface 101 (for example, if the front wheels 153 are to be used to provide motive force for rotating the rotating electromagnetic device 174).

As a result, when the towing vehicle 100 tows the towed vehicle 150, motive force generated by the towing vehicle 100 to move the towing vehicle 100 and the towed vehicle 150 may be harnessed by the wheels 153 and/or 155 of the towed vehicle 150 to rotate the rotating electromagnetic device 174 to generate electrical power. The resultant electrical power produced may be used to charge the power cells 172.

The towed vehicle 150 also may include a computing system 180 that, among other functions, may allow for selective engagement of the selective linkages 175 between the rotating electromagnetic device 174 and the wheels 153 and/or 155 and that may allow for selective electrical connection/disconnection between stator windings of the rotating electromagnetic device 174 and the power cells 172.

In various embodiments, allowing for selective engagement of the selective linkages 175 with the wheels 153 and/or 155 enables the rotating electromagnetic device 174 to be selectively engaged while the towed vehicle 150 is being towed by the towing vehicle 100. As a result, the rotating electromagnetic device 174 of the towed vehicle 150 can generate and supply electrical power to selectively recharge the power cells 172 while the towed vehicle 150 is being towed by the towing vehicle 100, as further described below. In various embodiments, allowing for selective electrical connection/disconnection between stator windings of the rotating electromagnetic device 174 and the power cells 172 enables the rotating electromagnetic device 174 to selectively generate but not supply electrical power to the power cells 172 while the towed vehicle 150 is being towed by the towing vehicle 100 (thereby resulting in no counter torque or braking force being generated).

The computing system 180 may be integrated with the towed vehicle 150 or otherwise used with the towed vehicle 150. When the computing system 180 is integral with the towed vehicle 150, the computing system 180 may have a display and keyboard or a touchscreen display to enable user operation of the computing system 180. When the computing system 180 is transportable aboard the towed vehicle 150, the computing system 180 may include a tablet computer, a smartphone, a smartwatch, or another portable computing system that includes a display and keyboard or a touchscreen display to permit user operation of the computing system 180. The computing system 180 may include communications facilities to enable communications with the computing system 110 aboard the towing vehicle 100 or with other remote computing systems as further described below.

The computing system 180 may allow for the selective engagement or disengagement of the selective linkages 175 between the wheels 153 and/or 155 and the rotating electromagnetic device 174. The computing system 180 may also allow for the selective electrical engagement or disengagement of the rotating electromagnetic device 174 from the power cells 172. It will be appreciated that when the rotating electromagnetic device 174 generates and supplies electrical power to the power cells 172 a counter-torque (that is, a braking force) is generated that presents an additional load on the towing vehicle 100—that may result in further consumption of power or fuel by the towing vehicle 100 that is attributable and/or chargeable to the towed vehicle 150.

Disengaging the selective linkages 175 between the wheels 153 and/or 155 and the rotating electromechanical device 174 will prevent generating and supplying electrical power to the power cells 172 and electrically disconnecting the stator windings of the rotating electromechanical device 174 such that no electrical current flows in the stator windings will prevent supplying electrical power to the power cells 172. Thus, disengaging the selective linkages 175 and/or electrically disconnecting the stator windings of the rotating electromechanical device 174 will avoid the counter-torque (caused by the rotating electromechanical device 174 generating and supplying electrical power to the power cells 172) that may present an additional load on the towing vehicle 100. It will be appreciated that mechanically disengaging the wheels 153 and/or 155 from the rotating electromechanical device 174 may provide a further marginal reduction of a load on the towing vehicle 100 by eliminating mechanical resistance involved in the selective linkages 175 and the rotating electromechanical device 174 being rotated during towing.

In various embodiments, the computing system 180 and/or the separate computing system 185 (such as a smartphone, smartwatch, or other portable computing system) may cause the selective linkages 175 to selectively engage or disengage the rotating electromechanical device 174 from the wheels 153 and/or 155 or electrically disconnect the rotating electromechanical device 174 from the power cells 172. As a result, the computing system and/or the separate computing system 185 may be used to control whether a load is applied to the towing vehicle 100 from the rotating electromagnetic device 174 when the rotating electromagnetic device 174 generates and supplies electrical power to the power cells 172.

Figure 2:
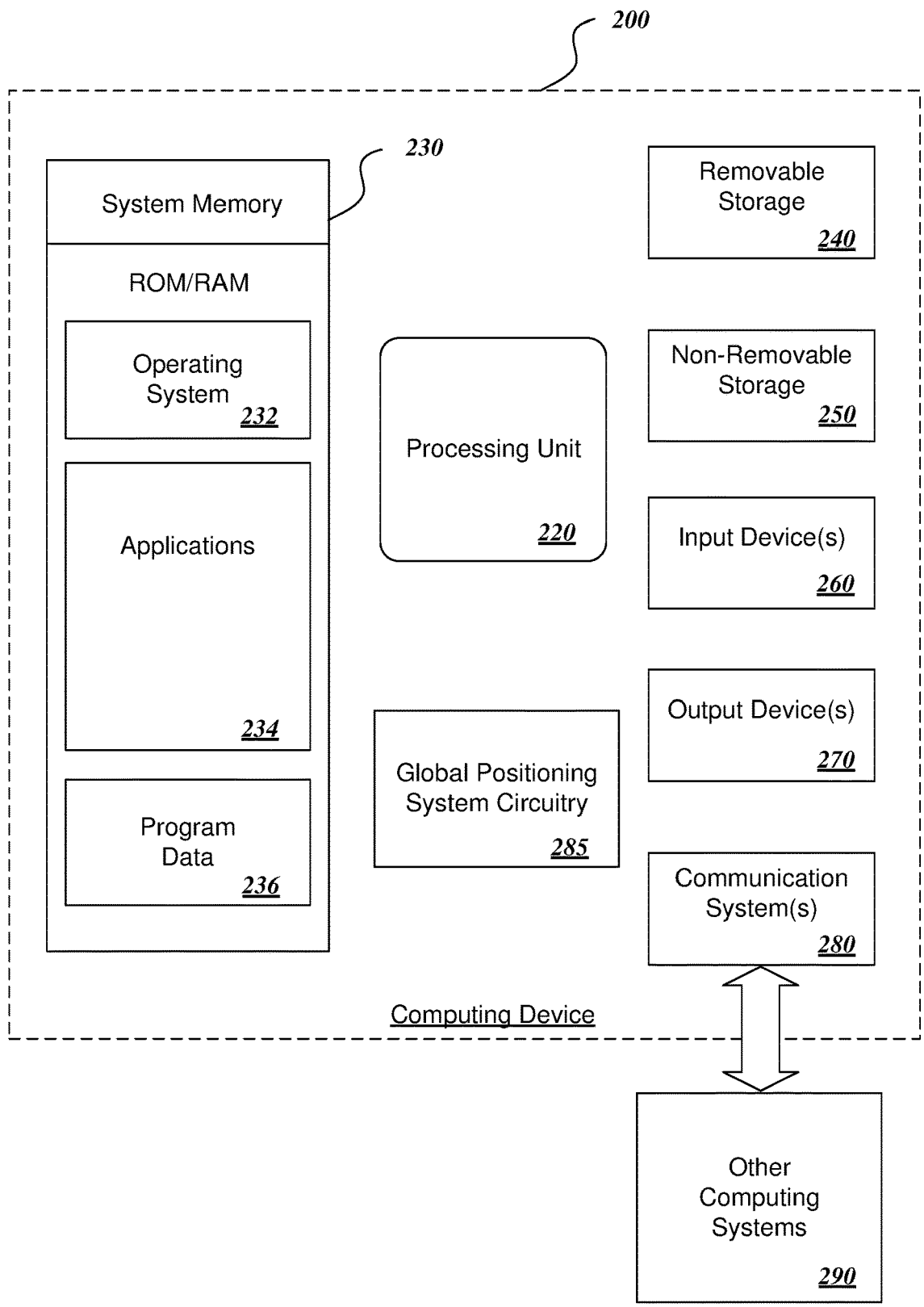
FIG. 2 is a block diagram of an illustrative computing device that may be used in the computing systems of FIG. 1.

Referring to FIG. 2 and given by way of illustration only and not of limitation, some form of an illustrative computing device 200 may be used for the computing system 110 aboard the towing vehicle 100, the computing system 180 aboard the towed vehicle 150, the separate computing system 185 that communicates with towed vehicle 150 or is the computing system 180 (FIG. 1), or a server system as further described below. In various embodiments, the computing device 200 typically includes at least one processing unit 220 and a system memory 230. Depending on the exact configuration and type of computing device, the system memory 230 may be volatile (such as random-access memory ("RAM"), non-volatile (such as read-only memory ("ROM"), flash memory, and the like) or some combination of volatile memory and non-volatile memory. The system memory 230 typically maintains an operating system 232, one or more applications 234, and program data 236. The operating system 232 may include any number of operating systems executable on desktop or portable devices including, but not limited to, Linux, Microsoft Windows®, Apple OS®, or Android®.

The computing device 200 may also have additional features or functionality. For example, the computing device 200 may also include additional data storage devices (removable and/or non-removable) such as, for example, magnetic disks, optical disks, tape, or flash memory. Such additional storage is illustrated in FIG. 2 by removable storage 240 and non-removable storage 250. Computer storage media may include volatile and non-volatile, removable and non-removable media implemented in any method or technology for storage of information, such as computer-readable instructions, data structures, program modules or other data. The system memory 230, the removable storage 240, and the non-removable storage 250 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 200. Any such computer storage media or other forms of storage media may be part of the computing device 200.

The computing device 200 may also have one or more input devices 260 such as a keyboard, mouse, pen, voice input device, touchscreen input device, etc. One or more output devices 270 such as a display, speakers, printer, short-range transceivers such as a Bluetooth transceiver, etc., may also be included. The computing device 200 also may include one or more communication systems 280 that allow the computing device 200 to communicate with other computing device 290, for example, as the computing system 110 and 180 aboard the towing vehicle 100 and the towed vehicle 150, respectively, communicates with a server system as further described below and vice versa. As previously mentioned, the communication system 280 may include systems for wired or wireless communications. Available forms of communication media typically carry computer-readable instructions, data structures, program modules, or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, RF, infrared and other wireless media. The term computer-readable media as used herein includes both storage media and communication media.

In further reference to FIG. 2, the computing device 200 may include global positioning system ("GPS") circuitry 285 that can automatically discern its location based on relative positions to multiple GPS satellites. As described further below, GPS circuitry 285 may be used to automatically report a location of the towing vehicle 100 and/or the towed vehicle 150, which may be used to determine a towing distance to a destination and/or other information that may be useful to the towing vehicle 100 or the towed vehicle 150.

Figure 3:
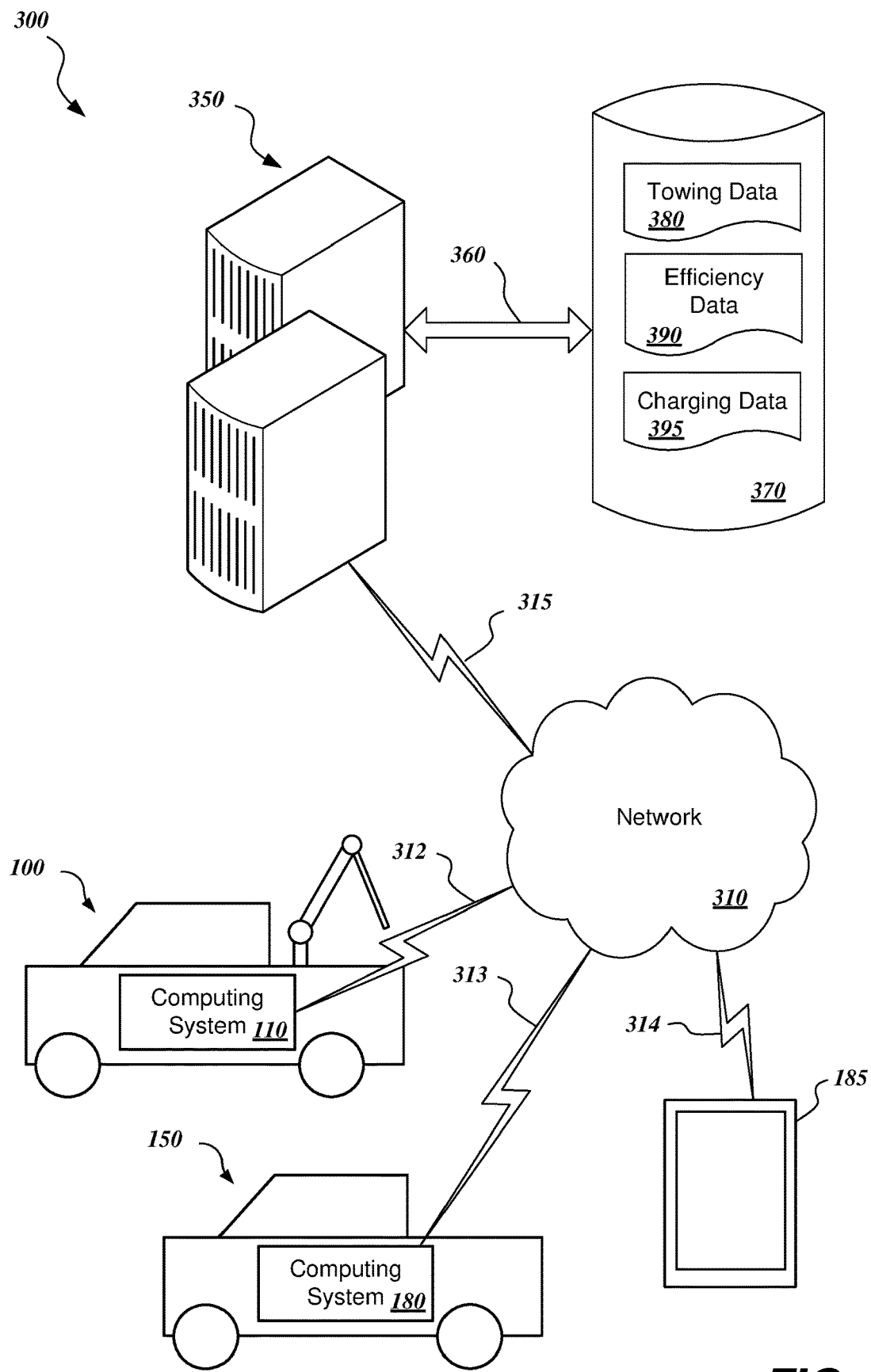
FIG. 3 is a block diagram in partial schematic form of an illustrative network that includes the computing systems of FIG. 1.

Referring to FIG. 3, an operating environment 300 of the computing systems 110, 180, and/or 185 is described. As described with reference to FIG. 2, a computing system 110 used by an operator the towing vehicle 100, the computing system 180 aboard the towed vehicle 150, and/or the separate computing system 185 used by an operator of the towed vehicle 150 all include a communication system 280 (FIG. 2) that enables the computing system 110, 180, and/or 185 to communicate over a network 310 with one or more server systems 350 to send or receive data. It will be appreciated that the operator of the towed vehicle 150 may be a driver of the towed vehicle or a non-driving occupant of the towed vehicle 150 (such as when the towed vehicle is an autonomous vehicle). The network 310 may include the Internet or another network. The communications system 280 of the computing system 110, 180, and 185 and the server systems 350 communicate over the network 310 using wired or wireless communications links 312, 313, 314, and 315. Because the computing system 110, the computing system 180, and the separate computing system 185 are mobile or portable devices, the communications links 312, 313, and 314 typically will be wireless communications links, such as cellular communications links, satellite network communications links, or other wide-area communications links.

The server systems 350 communicate with the network 310 over a wired or wireless link 315. The server systems 350 also communicate over high-speed channels 360 with one or more storage devices 370. The storage devices 370 include stores of towing data 380, that may include fuel usage data and/or fees for towing different types of vehicles. The towing data 380 may be accessed by the computing system 110 aboard the towing vehicle or be used to update a local store of towing data (not shown) on the computing system 110. The storage devices 370 also may include efficiency data 390 that may be used by the computing system 110 to determine how operating the rotating electromagnetic device 174 aboard the towed vehicle 150 (FIG. 1) may affect the load on the towing vehicle 100 and, thus, costs of towing the towed vehicle 150. The storage devices 370 also may include charging data 395 that may be used by the computing system 110, the computing system 180 or 185 to determine the extent to which the rotating electromagnetic device 174 should be operated to provide a desired level of charge to the power cells 172 (FIG. 1) for the towed vehicle 150. The charging data 395 may help the operator of the towed vehicle 150 to determine how much the operator is willing to pay for operating the rotating electromagnetic device 174 to charge the power cells 172 during towing. The charging data 395 may help the operator decide whether to bear the cost of operating the rotating electromagnetic device 174 to generate and supply electrical power to charge the power cells 172 during towing as opposed to waiting to charge the towed vehicle 150 after towing is completed.

In various embodiments, an object is to charge the towed vehicle 150 so that the power cells 172 of the towed vehicle 150 reach a desired charging level, whether the desired charging level is a specified charge level (e.g., a full charge, a half charge, etc.) or a sufficient charge to enable the towed vehicle 150 to be driven a specified distance. When the towing vehicle 100 is a personal vehicle, such as a recreational vehicle, the operator may wish to know when the power cells 172 of the towed vehicle 150 have been charged to a desired level. At this point, the operator may wish to disengage the rotating electromagnetic device 174 to save the load presented by operating rotating electromagnetic device 174 to generate and supply electrical power. In another case, when the towing vehicle 100 is a commercial towing vehicle, the operator may wish to determine what additional energy is being used to facilitate charging of the towed vehicle 150 so that the operator may appropriately charge for providing energy for the charging of the power cells 172 of the towed vehicle 150.

Figure 4:
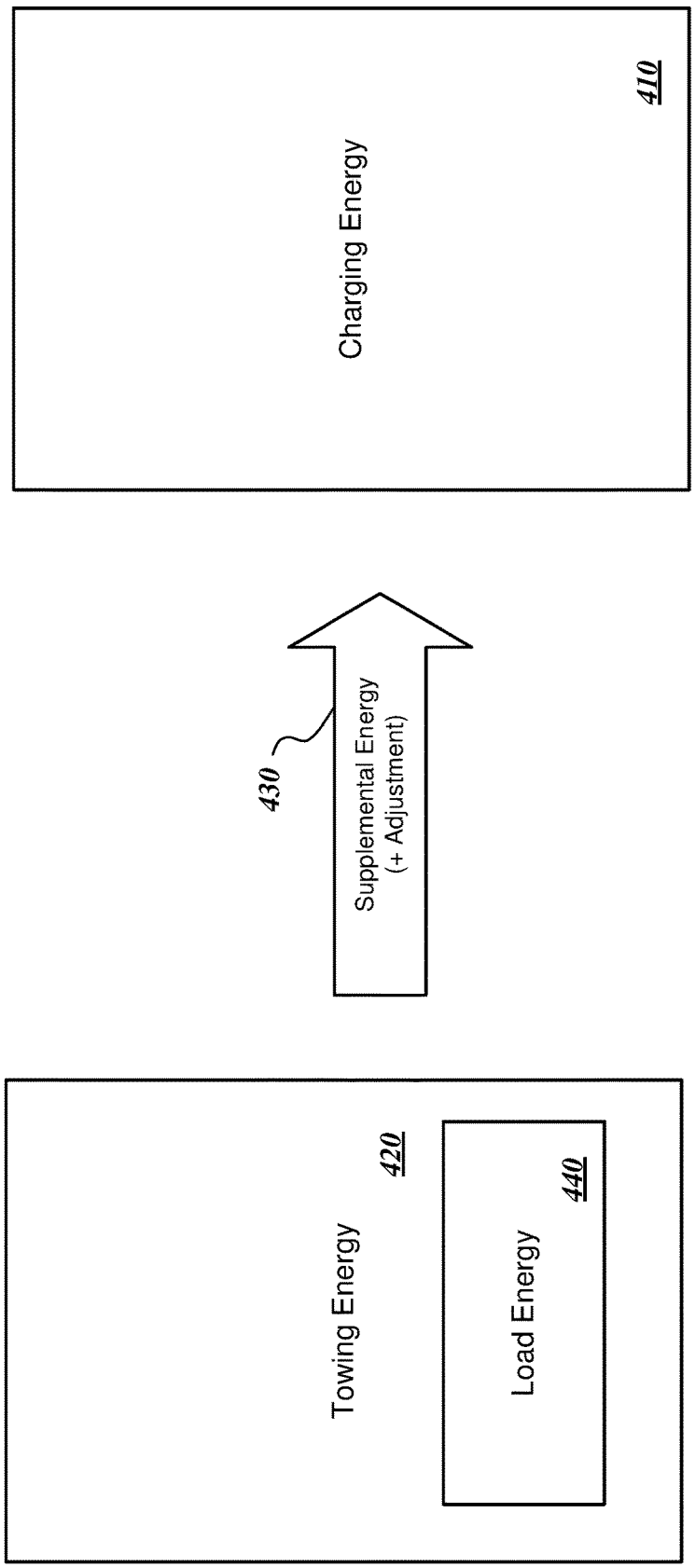
FIG. 4 is a block diagram of the charging energy for the towed vehicle of FIG. 1 resulting from towing energy supplied by the towing vehicle of FIG. 1.

In any case, referring to FIG. 4, it may be desirable to identify a quantity of charging energy 410 to be applied to the power cells 172 of the towed vehicle 150 by operation of the rotating electromagnetic device 174 (FIG. 1). Based on the quantity of charging energy 410 supplied, the operator may wish to determine a quantity of towing energy 420 expendable by the towing vehicle 110. The quantity of towing energy 420 may include a load energy 440 expendable in moving the towed vehicle 150 that is attributable to the energy required to physically move the towed vehicle 150. In addition, a portion of the towing energy 420 may be attributable the rotating electromagnetic device 174 of the towed vehicle 150 generating and supplying electrical power to selectively recharge the power cells 172 while the towed vehicle 150 is being towed by the towing vehicle 100. This portion of the towing energy 420 may be regarded as supplemental energy 430 used to provide the charging energy 410 to the power cells 172 of the towed vehicle 150.

It may be assumed that there will be some inefficiency in converting a portion of the towing energy 420 into the charging energy 410. For example, if the towing vehicle 100 is an electric vehicle, ninety percent of the supplemental energy 420 attributable to causing the rotating electromagnetic device 174 to generate and supply electrical power to the power cells 172 may go to charging the power cells 172. Thus, the supplemental energy 430 may include an adjustment to allow for such a loss or inefficiency. In other words, 10 kilowatt hours of energy expended by the towing vehicle 100 in providing supplemental energy 430 may result in 9 kilowatt hours of charging energy 410. By contrast, for an internal-combustion energy towing vehicle that may be only thirty percent efficient (or less), only thirty percent (or less) of the supplemental energy 430 may result in charging energy 410. By accounting for the supplemental energy 430 (with adjustment), an operator of the towing vehicle 100 can determine or track how much energy is expendable in providing charging energy 410 to the towed vehicle 150.

Figure 5:
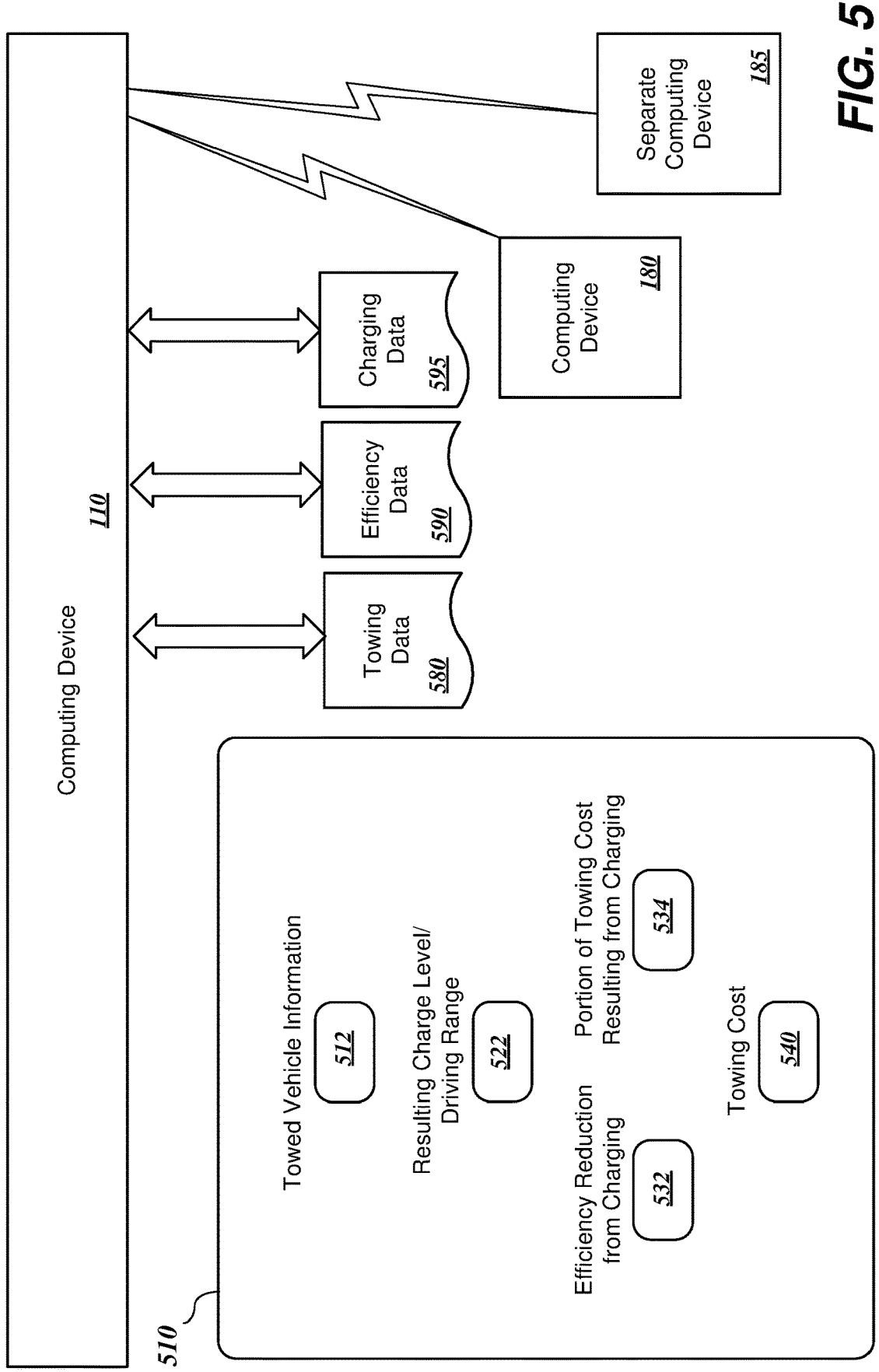
FIGS. 5-6 are block diagrams of illustrative computing systems usable by a towing vehicle and associated displays generated thereby.

Referring to FIG. 5, in various embodiments a display 510 of the computing system 110 aboard the towing vehicle 100 presents options for determining a cost of towing the towed vehicle 150. The display 510, as with the display 610 (FIG. 6) and the display 710 (FIG. 7) are presented by way of illustration and not limitation, and the display 510 may include more or fewer data fields to show more or less data, respectively. The illustrative display 510, along with the display 610 and the display 710, are depicted as touchscreen displays in which a user may engage the data fields to insert or change the data. However, it will be appreciated that the computing system 110 could include one or more other input devices to enable a user to enter and/or interact with data on the display 510.

The display 510 shows several data fields generated by the computing system 110. The data fields are generated from information maintained in local data stores, from the remote server systems 350, from the computing system 180 or the separate computing system 185 associated with the towed vehicle 150, and from computations based on this and other information stored in or accessible by the computing system 110.

Referring additionally to FIG. 5, the display 510 includes an input for towed vehicle information 512 describing the towed vehicle 150 (FIG. 1). The towed vehicle information 512, which may be entered, via the display 510, may include a make and model of the towed vehicle 150. The make and model of the towed vehicle 150 may be used to access information about the weight of the towed vehicle 150 to help determine the load placed on the towing vehicle 100 in towing the towed vehicle 150. The towed vehicle information 5125 also be used to retrieve information about a load caused by operating the rotating electromagnetic device 174 (FIG. 1) aboard the towed vehicle 150 to generate and supply electrical power to the power cells 172. A resulting charge level/driving range 522 indicates a percentage or other portion of charge to which the power cell 172 (FIG. 1) is desirably charged by the charging and/or a distance the towed vehicle 150 may be driven after the tow based on the charging of the power cell 172. In various embodiments, a user may specify a resulting charge level or desired driving distance 522 which will determine an extent to which the rotating electromagnetic device 174 must be operated to generate and supply electrical power to charge to the power cells 172 to a desired level.

The display 510 may present an efficiency reduction from charging 532 that the signifies an effect on the towing vehicle 100 from operating the rotating electromagnetic device 174 of the towed vehicle 150 to generate and supply electrical power to the power cells 172. The efficiency reduction from charge 532 may be helpful in understanding or explaining how the cost of the tow may vary as a result of operation of the rotating electromagnetic device 174 of the towed vehicle 150 to generate and supply electrical power to the power cells 172 as specified by field 522. Correspondingly, a portion of the towing cost 534 resulting from operation of the rotating electromagnetic device 174 to generate and supply electrical power to the power cells 172 may indicate what part of the cost of the tow results from the operation of the rotating electromagnetic device 174 to generate and supply electrical power to the power cells 172. The cost shown in field 534 may be determined by identifying an extra quantity of fuel used as a result of the load imparted by the rotating electromagnetic device 174 to generate and supply electrical power to the power cells 172 multiplied by a cost to be charged per unit of fuel. A portion of the towing cost 534 may be determined by from a difference in an estimated efficiency rating of the towing vehicle 100 towing the towed vehicle 150 with the rotating electromagnetic device 174 operating to generate and supply electrical power to the power cells 172 and an estimated efficiency rating of the towing vehicle 100 towing the towed vehicle 150 without the rotating electromagnetic device 174 operating to generate and supply electrical power to the power cells 172.

A towing cost 540 indicates an estimated total cost of the towing vehicle 100 towing the towed vehicle 150 to the destination, including the additional cost resulting from the rotating electromagnetic device 174 being operated to generate and supply electrical power to the power cells 172. The data displayed in fields 532, 534, and 540 may automatically adjust based on the other inputs and/or changes to the inputs.

In generating the data presented on the display 510, the computing system may access local stores of towing data 580, efficiency data 590, and charging data 595. The local stores 580, 590, and 595 may be similar to the data stores 380, 390, and 395 at the server system 350 as described with reference to FIG. 3. The local store of the towing data 580 may include rates to be charged that may have been set by the operator or the operator's organization. The local store of efficiency data 590 may indicate to what extent the load on the towing vehicle 100 is increased by operating the rotating electromagnetic device 174 of the towed vehicle 150 to generate and supply electrical power to the power cells 172. The charging data 595 may include information for the towed vehicle 150 that can be used to determine how much charge can be generated by operating the rotating electromagnetic device 174 to generate and supply electrical power to the power cells 172.

Some of the local stores 580, 590, and 595 may be accessible or updatable from the server system 350, as previously described with reference to FIG. 3. Also, the computing system 180 or the separate computing system 185 may provide information to the computing system 110 about the charging level or driving distance desired by a towing customer, data about how much charge may be generated by the rotating electromagnetic device 174 to generate and supply electrical power to the power cells 172. For example, the computing system 110 may communicate with the computing system 180 or the separate computing system 185 over the network 310 (FIG. 3) or by using another communications medium, such as Bluetooth or direct Wi-Fi communications between the computing systems 110, 180 and/or 185.

Figure 6:
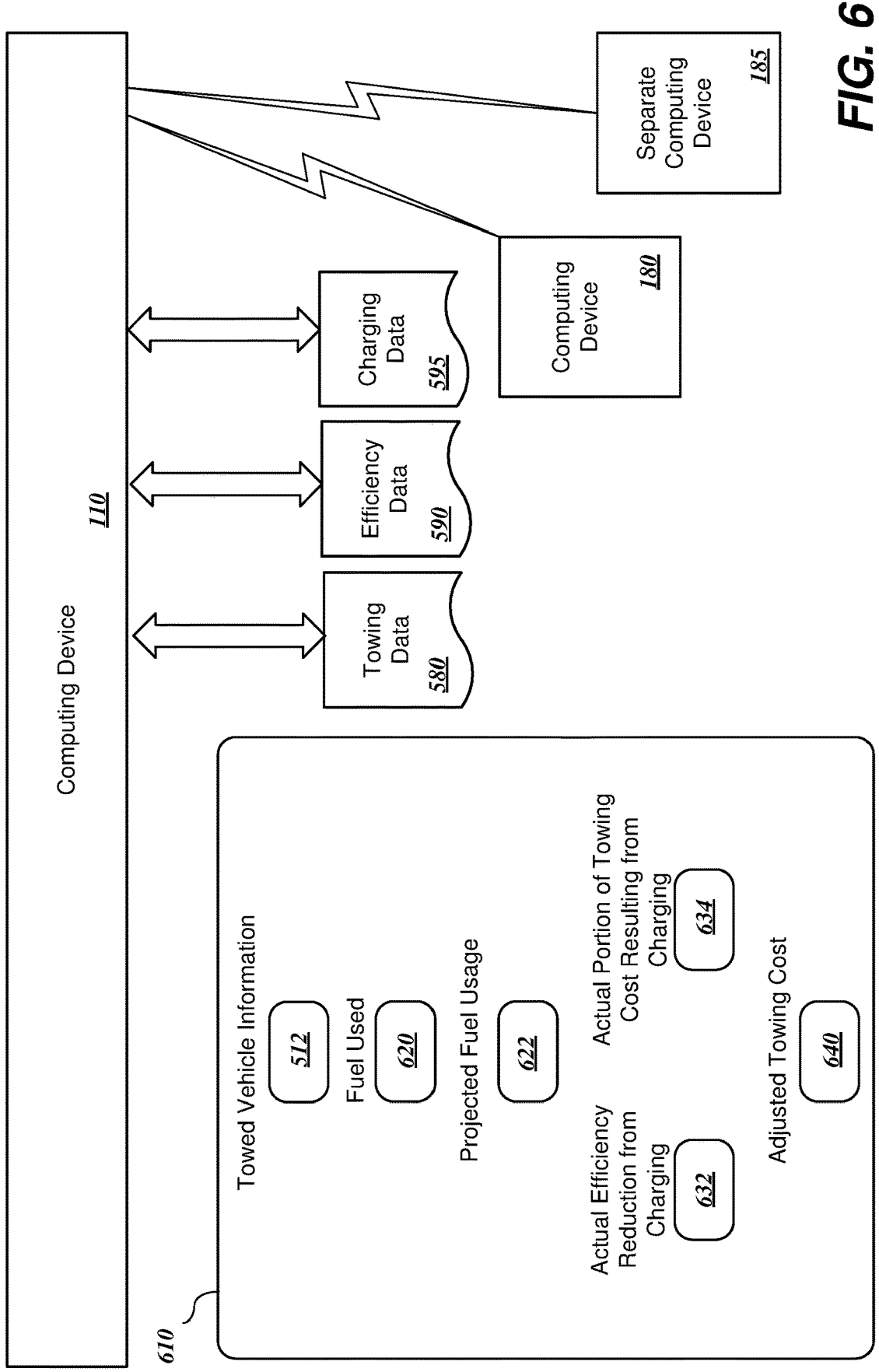

Referring to FIG. 6, a display 610 is similar to the display 510 of FIG. 5 and may similarly be generated by the computing system 110. The display 610 may include actual rather than estimated information. Fields such as the towed vehicle information 512 may be the same as the display 510. By contrast, a fuel used field 620 may be used to report an actual amount of fuel used thus far during the towing which may be used to generate a projected fuel usage 622 based on actual fuel use. The fuel used 620 and the projected fuel usage 622 may be updated during the course of the tow to reflect, for example, actual fuel usage resulting from operation of the rotating electromagnetic device 174 of the towed vehicle 150 to generate and supply electrical power to the power cells 172 (FIG. 1). As previously described with reference to FIG. 1, use of the rotating electromagnetic device 174 to generate and supply electrical power may be stopped when a desired charge level is reached. Thus, the impact on fuel usage in operating the rotating electromagnetic device 174 to generate and supply electrical power to the power cells 172 may be determined as a difference between the energy or fuel used in towing the towed vehicle 150 while the rotating electromagnetic device 174 is operating to generate and supply electrical power to the power cells 172 and the energy or fuel used by the towing vehicle 100 in towing the towed vehicle 150 while the rotating electromagnetic device 174 is not operating to generate and supply electrical power to the power cells 172.

Using this data, an actual efficiency reduction from charging 632, an actual portion of towing cost resulting from charging 634, and an adjusted towing cost 640 all may be regularly or continually updated to reflect the cost of the towing that may result from operating the rotating electromagnetic device 174 to generate and supply electrical power to the power cells 172. Using the actual data presented via the display 610, an operator of the towed vehicle 150 may choose when to disengage the rotating electromagnetic device 174 based on the accrued and/or accruing cost of the towing. If the operator of the towed vehicle 150 is able to remotely engage or disengage the rotating electromagnetic device 174, such as by using the separate computing system 185, the operator of the towed vehicle 150 may be able to choose how much charging he or she wishes to pay for during the course of towing.

Figure 7:
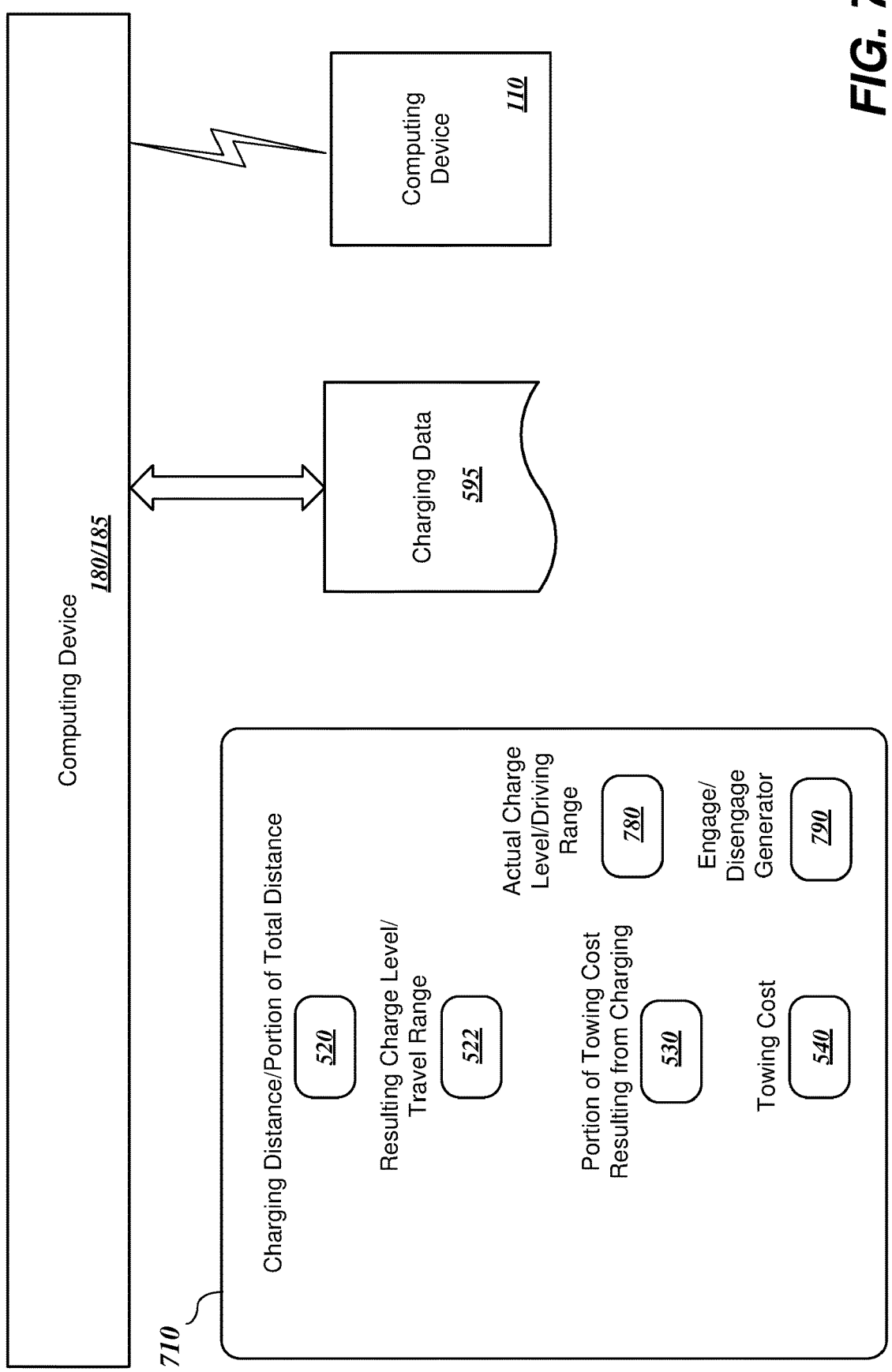
FIG. 7 is a block diagram of a computing system aboard the towing vehicle and/or the towed vehicle and an associated display generated thereby.

Referring to FIG. 7, a display 710 of the computing system 180 aboard the towed vehicle 150 or the separate computing system 185 enables an operator of the towed vehicle 150 to interact with parameters that may affect the level of charging and the resulting cost of the tow. The operator of the towed vehicle 150 may enter the charging distance/portion of total distance 420 or the desired resulting charge portion/driving range 422, as previously described with reference to FIGS. 4 and 5. The fields 420 and/or 422 may be entered by the operator of the towed vehicle using the computing system 180 or the separate computing system 185 and communicated to the computing system 110 aboard the towing vehicle 100. Correspondingly, the portion of towing cost resulting from charging 434 and the towing cost 440 may be calculated by the computing system 110 aboard the towing vehicle 100 and communicated to the computing system 180 or the separate computing system 185 for reporting to the operator.

Referring additionally to FIG. 7, the computing system 180 and/or the separate computing system 185 may include an actual charge level level/driving range field 780 to communicate to the operator an actual, current level of charge of the power cells 170 and/or how far the towed vehicle 150 may be driven using the level of charge. The computing system 180 and/or the separate computing system 185 also may include an engage/disengage generator button 790 to enable the operator to engage the rotating electromagnetic device 174 with the front wheels 153 and/or rear wheels 155 or to engage the rotating electromechanical device 174 to generate and supply electrical power to the power cells 172. Also, the engage/disengage generator button 790 may to enable the operator to disengage the rotating electromagnetic device 174 from the front wheels 153 and/or rear wheels 155 or to disengage the rotating electromechanical device 174 from the power cells 172 to avoid the counter-torque caused by generating and supplying electrical power to the power cells 172. With the indicator 780 and the button 790, the operator of the towed vehicle 150 may monitor actual charging of the towed vehicle 150 during the tow and may start or stop charging of the power cells 172 as desired based on the actual charge data reflected in the field 780.

Figure 8:
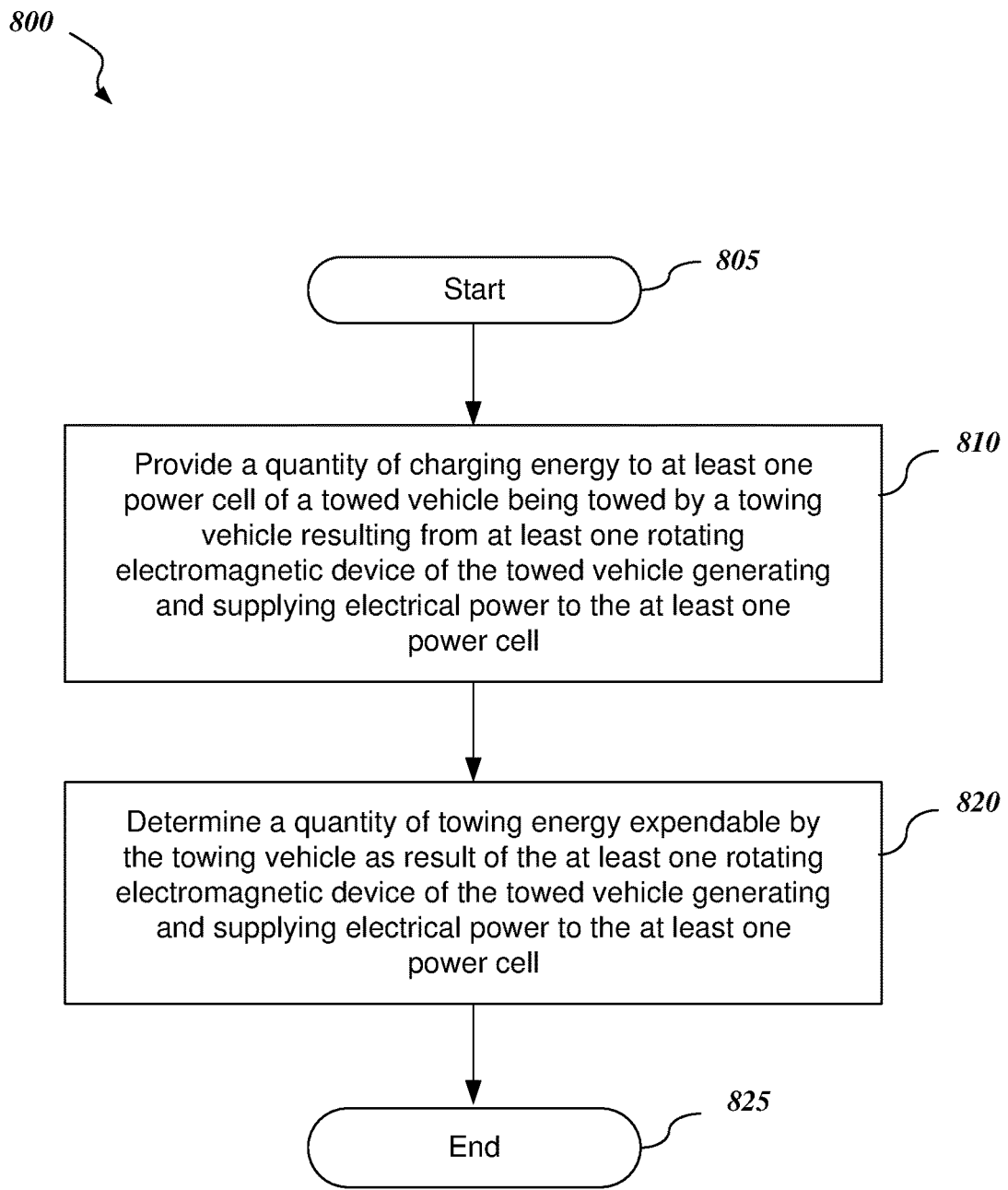
FIG. 8 is a flow chart of an illustrative method of determining a cost of towing attributable to operating a rotating electromagnetic device on the towed vehicle.

Referring to FIG. 8, an illustrative method 800 of determining a cost of towing a towed vehicle attributable to the towed vehicle operating a rotating electromagnetic device to charge its power cells is provided. The method 800 starts at a block 805. At a block 810, a quantity of charging energy is provided to at least one power cell of a towed vehicle being towed by a towing vehicle resulting from at least one rotating electromagnetic device of the towed vehicle generating and supplying electrical power to the at least one power cell. At a block 820, a quantity of towing energy expendable by the towing vehicle as result of the at least one rotating electromagnetic device of the towed vehicle generating and supplying electrical power to the at least one power cell is determined. The method ends at a block 825.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
   a computing system transportable aboard at least one of a towing vehicle and a towed vehicle, wherein the computing system includes computer-readable media storing computer-executable instructions configured to:
   receive towing data, efficiency data, and charging data from a data store, wherein the towing data comprises fuel usage data and fees for towing different types of towed vehicles, the efficiency data is used to determine costs of towing the towed vehicle based on how operating at least one rotating electromagnetic device of the towed vehicle affects a load on the towing vehicle, and the charging data is used to determine an extent to which the at least one rotating electromagnetic device should be operated to provide a desired level of charge to at least one power cell of the towed vehicle;
   based on the received towing data, efficiency data, and charging data, identify a quantity of charging energy to be supplied to the at least one power cell of the towed vehicle by the at least one rotating electromagnetic device of the towed vehicle generating and supplying electrical power to charge the at least one power cell of the towed vehicle while the towed vehicle is towed by the towing vehicle; and
   determine a quantity of towing energy expendable by the towing vehicle in towing the towed vehicle to provide the quantity of charging energy to the at least one power cell of the towed vehicle.

2. The system of claim 1, wherein the quantity of charging energy includes a charging level chosen from a specified charge level for the at least one power cell.

3. The system of claim 1, wherein the quantity of charging energy includes a driving capability level that will enable the towed vehicle to drive a specified distance.

4. The system of claim 1, wherein the quantity of towing energy includes a quantity of supplemental energy required and usable by the towing vehicle due to the at least one rotating electromagnetic device of the towed vehicle being used for generating and supplying the quantity of charging energy.

5. The system of claim 4, wherein the quantity of supplemental energy includes an adjustment reflective of additional energy expendable by the towing vehicle in providing for the quantity of charging energy to be supplied to the at least one power cell of the towed vehicle.

6. The system of claim 5, wherein the quantity of supplemental energy is determinable from a system chosen from a computing system aboard the towed vehicle and a remote computing system.

7. The system of claim 5, further comprising identifying a towing cost including a cost including at least one of the quantity of towing energy and a combined quantity of the quantity of towing energy and the adjustment.

8. The system of claim 7, wherein:
the towing vehicle includes an internal combustion engine-powered vehicle;
the quantity of supplemental energy includes a quantity of additional fuel consumable by the towing vehicle in towing the towed vehicle with the rotating electromagnetic device generating and supplying the electrical power; and
the cost of the quantity of charging energy includes a cost chargeable for the quantity of additional fuel consumable by the towing vehicle.

9. The system of claim 1, wherein the quantity of towing energy includes a quantity of load energy expendable by the towing vehicle in towing the towed vehicle when the at least one rotating electromagnetic device of the towed vehicle is not generating and supplying the quantity of charging energy, wherein the quantity of load energy includes for at least a portion of a distance that the towing vehicle tows the towed vehicle at least one of:
a quantity of energy expendable by the towing vehicle; and
a quantity of fuel expendable by the towing vehicle.

10. A vehicle comprising:
at least one power cell configured to provide electrical power;
a drive system configured to control one or more wheels of the vehicle to motivate, accelerate, decelerate, stop, and steer the vehicle, wherein the drive system includes an electrical power system including at least one rotating electromagnetic device configured to engage one or more of the wheels and further configured to generate electrical power in response to rotation of the one or more wheels and to supply the generated electrical power to charge the at least one power cell; and
a computing system operably coupled with at least one of the rotating electromagnetic device and the at least one power cell and including a computer-readable media storing computer-executable instructions configured to:
receive towing data efficiency data, and charging data from a data store, wherein the towing data comprises fuel usage data and fees for towing different types of towed vehicles, the efficiency data is used to determine costs of towing the vehicle based on how operating the at least one rotating electromagnetic device of the vehicle affects a load on a towing vehicle, and the charging data is used to determine an extent to which the at least one rotating electromagnetic device should be operated to provide a desired level of charge to the at least one power cell of the vehicle;
based on the received towing data, efficiency data, and charging data, identify a quantity of charging energy to be supplied to the at least one power cell of the vehicle by the at least one rotating electromagnetic device of the vehicle generating and supplying electrical power to charge the at least one power cell of the vehicle while the vehicle is towed by the towing vehicle; and
determine a quantity of towing energy expendable by the towing vehicle in towing the vehicle to provide the quantity of charging energy to the at least one power cell of the vehicle;
wherein the at least one power cell is adapted to receive the identified quantity of charging energy.

11. The vehicle of claim 10, wherein the quantity of charging energy includes a charging level chosen from a specified charge level for the at least one power cell.

12. The vehicle of claim 10, wherein the quantity of charging energy includes a driving capability level that will enable the towed vehicle to drive a specified distance.

13. The vehicle of claim 10, wherein the quantity of towing energy includes a quantity of supplemental energy required and usable by the towing vehicle due to the at least one rotating electromagnetic device of the towed vehicle being used for generating and supplying the quantity of charging energy.

14. The vehicle of claim 13, wherein the quantity of supplemental energy includes an adjustment reflective of additional energy expendable by the towing vehicle in providing for the quantity of charging energy to be supplied to the at least one power cell of the towed vehicle.

15. The vehicle of claim 14, wherein the quantity of supplemental energy is determinable from a system chosen from a computing system aboard the towed vehicle and a remote computing system.

16. The vehicle of claim 14, further comprising identifying a towing cost including a cost including at least one of the quantity of towing energy and a combined quantity of the quantity of towing energy and the adjustment.

17. The vehicle of claim 10, wherein the quantity of towing energy includes a quantity of load energy expendable by the towing vehicle in towing the towed vehicle when the at least one rotating electromagnetic device of the towed vehicle is not generating and supplying the quantity of charging energy, wherein the quantity of load energy includes for at least a portion of a distance that the towing vehicle tows the towed vehicle at least one of:
a quantity of energy expendable by the towing vehicle; and
a quantity of fuel expendable by the towing vehicle.

18. A method comprising:
receiving towing data, efficiency data, and charging data from a data store, wherein the towing data comprises fuel usage data and fees for towing different types of towed vehicles, the efficiency data is used to determine costs of towing a towed vehicle based on how operating at least one rotating electromagnetic device of the towed vehicle affects a load on a towing vehicle, and the charging data is used to determine an extent to which the at least one rotating electromagnetic device should be operated to provide a desired level of charge to at least one power cell of the vehicle;
based on the received towing data, efficiency data, and charging data, providing a quantity of charging energy to the at least one power cell of the towed vehicle being towed by the towing vehicle resulting from the at least one rotating electromagnetic device of the towed vehicle generating and supplying electrical power to the at least one power cell; and
determining a quantity of towing energy expendable by the towing vehicle as result of the at least one rotating electromagnetic device of the towed vehicle generating and supplying electrical power to the at least one power cell.

19. The method of claim 18, wherein the quantity of charging energy includes a charging level chosen from a specified charge level for the at least one power cell.

20. The method of claim 18, wherein the quantity of charging energy includes a driving capability level that will enable the towed vehicle to drive a specified distance.

* * * * *